United States Patent
Werner et al.

(10) Patent No.: US 7,130,443 B1
(45) Date of Patent: Oct. 31, 2006

(54) WATERMARKING

(75) Inventors: Oliver Hartwig Werner, Surrey (GB); Andrew James Mason, Surrey (GB); Richard Aubrey Salmon, Redhill (GB)

(73) Assignee: British Broadcasting Corporation, Lndon (GB)

( * ) Notice: Subject to any disclaimer, the term of this patent is extended or adjusted under 35 U.S.C. 154(b) by 0 days.

(21) Appl. No.: 09/936,816

(22) PCT Filed: Mar. 20, 2000

(86) PCT No.: PCT/GB00/01033

§ 371 (c)(1),
(2), (4) Date: Jan. 4, 2002

(87) PCT Pub. No.: WO00/56058

PCT Pub. Date: Sep. 21, 2000

(30) Foreign Application Priority Data

| Mar. 18, 1999 | (GB) | ................................... 9906299.4 |
| Nov. 9, 1999 | (GB) | ................................... 9926530.8 |
| Dec. 22, 1999 | (GB) | ................................... 9930353.9 |

(51) Int. Cl.
*G06K 9/00* (2006.01)

(52) U.S. Cl. ........................................ 382/100; 713/176
(58) Field of Classification Search ................ 382/100, 382/232, 240; 380/51, 54, 201, 210, 252, 380/287; 713/176, 179; 358/3.28; 370/522–529; 348/461, 463; 283/72–81, 85, 93, 901, 902, 283/113; 725/20, 22; 375/130
See application file for complete search history.

(56) References Cited

U.S. PATENT DOCUMENTS

| 5,636,292 A | 6/1997 | Rhoads |
| 5,710,834 A | 1/1998 | Rhoads |
| 5,721,788 A | 2/1998 | Powell et al. |
| 5,745,604 A | 4/1998 | Rhoads |
| 5,748,763 A | 5/1998 | Rhoads |
| 5,748,783 A | 5/1998 | Rhoads |
| 5,765,152 A | 6/1998 | Erickson |
| 5,768,426 A | 6/1998 | Rhoads |
| 5,809,160 A | 9/1998 | Rhoads |
| 5,822,436 A | 10/1998 | Rhoads |
| 5,832,119 A | 11/1998 | Rhoads |
| 5,841,886 A | 11/1998 | Rhoads |
| 5,841,978 A | 11/1998 | Rhoads |

(Continued)

FOREIGN PATENT DOCUMENTS

EP  0 859 337 A2  2/1998

(Continued)

OTHER PUBLICATIONS

Voyatzis, G., et al. "Chaotic Watermarks for embedding In the Spatial Digital Image Domain." IEEE Transactions, Thessalonikl, Greece, 1998, pp. 432-436.

(Continued)

*Primary Examiner*—Jingge Wu
*Assistant Examiner*—Abolfazl Tabatabai
(74) *Attorney, Agent, or Firm*—McDermott Will & Emery LLP

(57) ABSTRACT

A watermarking system and method is proposed for still or moving pictures in which a watermark is embedded robustly and simply into DC-values, but without causing unacceptable visible picture degradation. The watermark is secure and can be readily detected, and the method can be used to convey additional data. Also disclosed is a method for watermarking a sequence of pictures in which the visibility of artifacts is reduced. The watermark may carry data and may be used to label a program.

8 Claims, 3 Drawing Sheets

U.S. PATENT DOCUMENTS

| | | | | |
|---|---|---|---|---|
| 5,850,481 | A | * | 12/1998 | Rhoads ................. 382/232 |
| 5,862,206 | A | | 1/1999 | Thomas et al. |
| 5,862,260 | A | | 1/1999 | Rhoads |
| 5,960,081 | A | * | 9/1999 | Vynne et al. ............ 713/176 |
| 6,064,764 | A | * | 5/2000 | Bhaskaran et al. ...... 382/183 |
| 6,154,571 | A | * | 11/2000 | Cox et al. ............... 382/250 |
| 6,185,312 | B1 | * | 2/2001 | Nakamura et al. ...... 382/100 |
| 6,209,094 | B1 | * | 3/2001 | Levine et al. ........... 713/176 |

FOREIGN PATENT DOCUMENTS

| | | |
|---|---|---|
| EP | 0 860 997 A2 | 2/1998 |
| EP | 0 828 372 | 3/1998 |
| EP | 0905967 A1 | 3/1999 |
| EP | 1 028 585 A1 | 8/2000 |
| EP | 1 217 840 | 6/2002 |
| GB | 2 348 028 | 7/1999 |
| GB | 2 347 295 A | 8/2000 |
| WO | WO 98/02864 | 1/1998 |
| WO | WO 9802864 A | 1/1998 |
| WO | WO 99/17536 | 4/1999 |
| WO | WO 99/36876 | 7/1999 |

OTHER PUBLICATIONS

Boland, F.M. et al., "Watermarking Digital Images for Copyright Protection", International Conference on Image Processing and its Applications, GB, London, Jul. 4, 1995, pp. 326-330.

Piva, A. et al., "DCT-Based Watermark Recovering Without Resorting to the Uncorrupted Original Image", Proceedings of the International Conference on Image Processing, US, Los Alamitos, CA, IEEE, 1997, pp. 520-523.

* cited by examiner

WATERMARKING

BACKGROUND OF THE INVENTION

Field of the Invention

The invention relates to embedding a watermark into either a still picture or a sequence of moving pictures; this may be used to assist in detection of copying or identification of the originator of material or for transmitting hidden data. A watermark is a mark or data sequence that is embedded substantially invisibly into a picture for helping to identify the originator or the intended recipient of the picture or to detect tampering.

It has been considered to modulate a watermark onto sample mean values, also known as DC-values, but this has tended to result in unacceptable picture distortion.

Yeung and Mintzer [Journal of Electronic Imaging 7(3), 578–591 (July 1998)] proposed a watermarking system in which a watermark is applied to DC coefficients of a JPEG compressed image. This is stated to produce satisfactory results for an RGB image but there was some noticeable degradation (blockiness) observed when the watermark was applied to luminance values. Investigations by the inventor have suggested that such a technique is unsuited to high quality image reproduction or broadcast quality motion video marking as the artifacts tend to become too visible, and one is generally dealing with a luminance signal rather than an RGB signal.

Qiao and Nahrstedt [IEEE International Conference on Multimedia Computing and Systems, Austin Tex. USA, 28th Jun.–1st Jul. 1998] proposed a watermarking technique in which a watermark is applied to DCT coefficients in the transform domain. The technique is suitable for MPEG coded video. This disclosure notes that problems can arise when a watermark is applied to both DC and AC coefficients and suggests that no watermark should be applied to the DC coefficients. A drawback of this method is that the watermark must be applied in the transform domain and this may require transformation of an image, thereby increasing the complexity of the method.

For the above reasons, attempts have concentrated largely on spread spectrum techniques or embedding information into frequency bands other than DC values. The watermark is usually modulated onto a low frequency band. This makes the watermark more robust against attacks that are based on low pass signal processing such as data compression or digital filtering. This is in line with the properties of the human visual system. As a consequence, an attack on a low frequency band for corrupting the watermark information runs the risk of introducing visible distortions into the picture. However, for similar reasons, embedding the watermark may present problems; it may either require complex and difficult to reproduce algorithms, may not embed the data reliably, or may introduce visible distortions.

A number of patents assigned to Digimarc Corporation having similar disclosures, of which U.S. Pat. No. 5,832,119 is a representative example, disclose a watermarking method in which a periodically repeating picture is filtered to remove low and high frequency components to leave only mid-band components and added to a picture. In addition to the drawbacks identified above for techniques of this nature, a specific drawback with this method which the inventor has identified is that the watermark may become visible with certain picture types, particularly in flat areas of the picture. Due to the complexity of the method and hence processing required, the method is unsuited, in practical terms, to marking of moving video sequences, particularly of broadcast quality.

The inventor has appreciated that, whilst attempts to modulate a watermark signal onto DC values have generally been unsuccessful for the reasons mentioned above, the use of DC values might offer a robust and simple watermarking system as compared to conventional techniques, if these difficulties could be overcome.

BRIEF SUMMARY OF THE INVENTION

By making use of a plurality of adjustment factors for each watermark value, each of which adjustment factors is a function of a local estimate of visibility of the watermark within the picture and which is a function of the picture sample values (and substantially independent of the watermark values), it has been found that, surprisingly, the watermark information can be reliably embedded in the picture without causing unacceptable distortion to the picture. The embedded watermark value may then change the local mean or DC-values of the subset of pixels in which it is embedded, rendering detection simple and reliable.

It will be appreciated that this method may result in a watermarked picture in which watermark information is barely present or even not present at all in certain regions of the picture where the estimate of visibility suggests that the presence of the watermark is likely to cause visible distortions to the picture.

Preferably the magnitude of adjustment factors is determined from the picture sample values based on an estimate of visibility, preferably from the local variance. This enables the watermark values to be concealed effectively. There will be a plurality of values calculated for each subset, to take into account picture variation, and there is preferably an independently determined adjustment value for each picture sample, although calculation of neighbouring adjustment factors may involve some overlap to reduce calculation.

The sign of the adjustment factors is preferably a function of the watermark values, the watermark values preferably comprising a binary sequence of 0 and 1, being encoded as positive and negative signs respectively, or vice versa. By changing the sign, a robust coding scheme is provided, the magnitude of the change not being critical in detecting the watermark and hence being adjustable to allow the watermark to be kept substantially invisible. Alternatively, the magnitude may be adjusted in steps; this may increase the available data capacity but may increase visibility, reduce robustness or increase complexity.

In a development, since measures of visibility may be determined from the watermarked picture which should correspond substantially to the originally determined measures of visibility, it should be possible at a decoder to determine the available room for data and thus to employ dynamic allocation of watermark values or data values by encoding more data (perhaps 2 or even 3 bits) in a region where the visibility estimate suggests that larger adjustments can be tolerated. Similarly, decoding may disregard regions where a visibility estimate suggests that no data will be encoded. Weighted filtering may be employed at a decoder, based on an estimate of visibility.

As an alternative to a binary system using positive and negative signs, a three level system in which zero adjustment is employed could be used; this may not be so advantageous for simple watermarking as zero adjustments would not assist in correlation, but could be used for data samples carried within the watermark (as discussed below) to increase the data capacity.

The adjustment factors may be combined with picture values by adding (which term is intended to encompass weighted addition or subtraction); this is simple to implement but effective, but more complex combination such as averaging may be employed.

Where it is desired for the watermark to be robust, for example to carry data or to make the watermark difficult to delete so that the source can be identified, as indicated above, the picture samples are preferably substantially adjacent. Small translations and distortions will tend to leave at least some of each subset of samples sufficiently unaffected for a determination of the watermark value for that subset. A grid may be defined, preferably substantially rectangular for ease of processing, although hexagonal or other grid shapes may be employed, and the samples in each region of the grid may be assigned to a subset. In this way, when it comes to decoding, a slight misalignment of the grid will normally not prevent the majority of samples within a decoding grid from carrying the correct value and permitting correct decoding.

When the picture is to be coded or compressed by an algorithm which partitions the picture into blocks, for example JPEG or MPEG coding, the grid preferably corresponds to blocks or groups of blocks of the coding algorithm. This may enable efficient processing and may also ensure that the watermark is reliably carried (more so than if individual watermark values were assigned to pixels in different blocks).

It has been found that if each subset comprises a block of at least about 4 by 4 samples (or 16 samples if non-rectangular grouping is used), this provides a much higher degree of robustness against a variety of attacks than a comparative example in which significantly fewer (or only one) picture samples per watermark value are employed. Preferably, blocks of at least about 8 by 8 samples (or similar size, at least about 64 samples if non-rectangular grids) are used, more preferably, at least for broadcast quality images, blocks of at least about 8 by 16 (preferably 8 vertically, 16 samples horizontally).

In a preferred development, a restriction condition is applied to the choosing of watermarks from the available watermarks. This may reduce the amount of data that can be carried but may increase robustness or error tolerance or detection. In a preferred embodiment, the watermarks are subdivided into subsets (for example 16 watermarks are sub-divided into 4 subsets of 4 marks) and a restriction condition related to the subsets is employed, for example exactly one (or in certain less preferred cases another predetermined number, for example in the case of larger subsets) watermark is chosen from each subset or each of a predetermined number of subsets (for example 1 mark from each of 3 of 4 subsets of 4 marks). By applying such a restriction, a measure of errors or the reliability of the data can be obtained based on the fact that there should be a given number (preferably one) of watermarks in each subset so if detection yields no marks or a reasonable probability of more than one mark in a subset, it can be assumed that the data is noisy or unreliable.

Watermark values may be assigned to substantially the whole of a picture. This may increase the dimension of the watermark and make unauthorised copying and detection more difficult. However, a repeating watermark may be used, or certain portions of the picture may be left blank.

The watermark may comprise a substantially static component and a variable component, the static component enabling the watermark to be positively identified, and the variable component carrying additional information, for example one or more of picture (or programme) title, date, author, originator, intended recipient, copying permissions, equipment or recording or coding conditions, user definable data and the like. Looked at another way, data may be carried with the watermark. In the case of a moving picture sequence, a separate hidden data stream may be carried, some of the watermark assisting in alignment and framing and the remainder carrying user data. If the application is such that the source and framing of the sequence can be guaranteed, then no static watermark may be needed for synchronisation, and the whole of the watermark may in fact comprise variable user information.

In certain cases, it may be desirable to make the watermark "fragile", so that processing of the data can be detected readily by measuring degradation of the watermark; this may be used for authentication of original copies. This may be achieved by scattering the picture sample values of each subset over the picture, and by increasing the number of watermark values and decreasing the number of pixels per value. At the extreme, the method may be modified to use only a single picture sample per watermark value, but this will normally require use of the original picture to detect the watermark reliably.

The watermark preferably comprises a pseudo random pattern; this makes it harder for an unauthorised person to detect or apply the watermark. However, in certain applications, a logo or regular pattern may be employed; this may simplify identification, for example visually from a difference picture.

When the watermark is embedded into a moving sequence, it has been found that, surprisingly, although the watermark may be almost impossible to detect when the sequence is viewed frame by frame or in slow motion, artifacts may become visible when the sequence is viewed at normal speed. Investigation has found that this is due to movement in the picture causing the effectively static grid corresponding to assignment of watermark values to appear in a similar manner to a dirty window overlaid on the picture. Further investigations have revealed that other known watermarking techniques, when examined closely, are prone to similar problems. The prior art does not address these unforseen problems which are peculiar to moving sequences.

The invention further provides methods of creating, embedding and detecting data-carrying watermarks, methods of marking moving pictures, applications of marked pictures, computer program products and apparatus for implementing any of the methods described above or below and further aspects and preferred features are set out in the other independent and dependent claims respectively, and may also be found in the following description of a preferred embodiment.

BRIEF DESCRIPTION OF THE DRAWINGS

An embodiment of the invention will now be described by way of example, with reference to the accompanying drawings in which:—

DETAILED DESCRIPTION OF THE INVENTION

Figure 1:
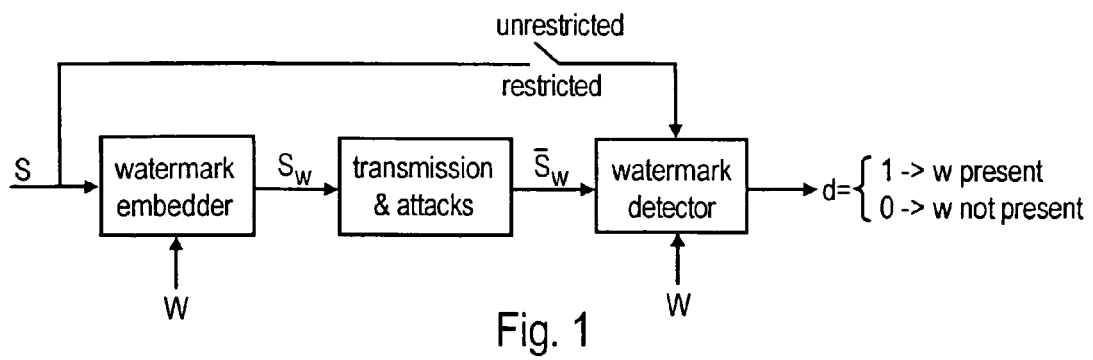
FIG. 1 shows a general outline of a watermarking system.

Referring to FIG. 1, the watermark w is embedded into the original signal, resulting in the watermarked signal. The watermarked signal may be changed by friendly attacks that are caused by transmission techniques e.g. data compression or by hostile attacks that deliberately attempt to remove the watermark. Therefore, the signal $\hat{s}_w$ instead of $s_w$ feeds the input of the watermark-detector. The detector outputs a binary decision which indicates if a given watermark is present in the input signal or not.

In this description restricted watermarking means that the original signal is also needed as an input to the watermark-detector. In this case watermark detection is restricted to users who are in possession of the original signal. Unrestricted watermarking means that the original signal is not needed during detection. Both cases will be addressed.

The watermark is a zero-mean (to prevent a change in global mean [average brightness] of the signal after watermarking) white noise random signal that is chosen independently from the original signal and difficult-to-predict for an attacker. The role of the watermark is similar to the role of the secret key in a symmetric crypto-system. A pseudo random bit generator can be used for obtaining the antipodal series w(1), . . . w(k), . . . w(K) with $$w^2(k)=1, k=, \ldots, K. \qquad (1)$$

In restricted watermarking the seed-number of the bit generator can depend on the value of a hash function that is applied to the samples of the original signal for providing authentication.

Figure 2:
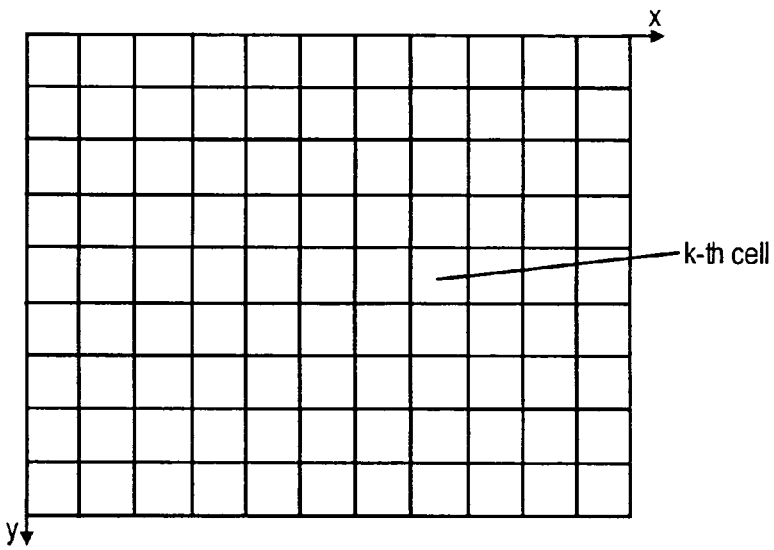
FIG. 2 illustrates partition of a picture into square cells.

The original picture s is partitioned into cells. This is shown in FIG. 2 for a square cell shape. There is no restriction on the cell shape and any other tiling of the x/y-plane can be used just as well, for example a hexagonal grid. The cell shape and the cell size are parameters that are kept secret together with the watermark w. Let $C_k$ denote the set of indices that select the samples of the k-th cell. The watermark is modulated onto the sample values as $$s_w(n)=s(n)+w(k)\cdot\alpha^2(n), n\epsilon C_k. \qquad (2)$$

Figure 3:
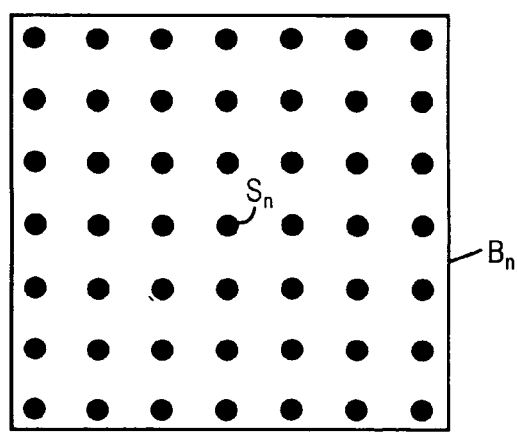
FIG. 3 schematically illustrates an example of calculation of variance for current sample $s_n$ and its neighbouring samples that belong to $B_n$.

The magnitude depends on a visibility measure and determines by how much the amplitude of a sample can be changed without creating a visible distortion. For example the local variance can be calculated in a small window of 7×7 samples that is centred at the current sample position, see FIG. 3. Let $B_n$ denote the set of indices that select the samples in the neighbourhood including the current index n.

The variance is calculated as $$var(n) = \left(\frac{1}{|B_n|} \cdot \sum_{l \epsilon B_n} s^2(l)\right) - \left(\frac{1}{|B_n|} \cdot \sum_{l \epsilon B_n} s(l)\right)^2 \qquad (3)$$

Averaging over all samples gives the mean value $$\overline{var} = \frac{1}{N} \cdot \sum_{n=1}^{N} var(n) \qquad (4)$$

Additionally, the positive modulation index q is introduced for allowing a global control of the energy of the modulated watermark, resulting in the magnitude $$\alpha^2(n) = \begin{cases} \frac{2 \cdot var(n) + \overline{var}}{var(n) + 2 \cdot \overline{var}} & var(n) > th_{flat} \\ & \text{if} \\ 0 & var(n) \leq th_{flat} \end{cases} \qquad (5)$$

As a consequence of eq. (5) no watermark information is embedded into flat areas that are detected with a threshold $th_{flat}$.

Eqn. (5) is one example for the calculation of the magnitude $\alpha^2(n)$ and more sophisticated models of the human visual system can be applied in combination with the embedding method that is specified in eq. (2).

After transmission and possible attacks the received signal $\check{s}_w$ is partitioned into cells of appropriate shape and size corresponding to the embedding procedure. For each cell a sample mean value is calculated, hereafter called DC-value. The DC-value of the k-th cell is calculated as $$DC(k) = \frac{1}{|C_k|} \cdot \sum_{n \epsilon C_k} \check{s}_w(n), \qquad (6)$$

In restricted watermarking a corresponding DC-value is calculated from the original signal s, $$DC_{ori}(k) = \frac{1}{|C_k|} \cdot \sum_{n \epsilon C_k} s(n), \qquad (7)$$

and in unrestricted watermarking a prediction value is calculated from the DC-values specified in eq. (6), $$DC_{pred}(k) = \frac{1}{|C_k|} \cdot \sum_{\substack{l \\ l \neq k}} \beta_l \cdot DC(l) \qquad (8)$$

The coefficients $\beta_l$ are the same for each picture and can be calculated by linear regression for minimising the mean squared error between DC(k) and $DC_{pred}(k)$. However, in terms of computational complexity a simpler prediction method is to average the DC-values of the neighbouring cells.

In restricted watermarking $\Delta DC(k)=(DC(k)-DC_{pred}(k))$ and in unrestricted watermarking $\Delta DC(k)=(DC(k)-DC_{ori}(k))$ is correlated with the watermark, $$corr = \frac{\left(\frac{1}{K} \cdot \sum_{k=1}^{K} \Delta DC(k) \cdot w(k)\right) - \left(\frac{1}{K} \cdot \sum_{k=1}^{K} \Delta DC(k)\right) \cdot \left(\frac{1}{K} \cdot \sum_{k=1}^{K} w(k)\right)}{1 - \left(\frac{1}{K} \cdot \sum_{k=1}^{K} w(k)\right)} \quad (9)$$

The detector decides upon the presence of the watermark in the signal $š_w$ if the magnitude of the correlation value exceeds a threshold, $|corr| \geq th_{detect}$. The sign sgn(corr) of the correlation value signals one hidden data bit if the presence of the watermark is detected. As no watermark information is embedded into flat areas the detector has the option to exclude flat areas during the evaluation of eq. (9).

In restricted watermarking it is easier to align the sampling grid of the received signal $š_w$ relative to the sampling grid that was used for embedding the watermark. This can be done by comparing $š_w$ with the original signal s which also allows compensation for geometric distortions such as scaling or rotation. In unrestricted watermarking the sampling grids can be aligned by a search for maximum correlation among a set of horizontal and vertical offset values that are applied to the sampling grid of $š_w$. As every watermark sample is spread over one cell perfect alignment of the sampling grids is not needed for obtaining a good correlation. This property improves significantly the robustness against attacks that re-sample the picture including geometric attacks that introduce an unnoticeable amount of distortion. Additionally, the cell size and the cell shape can be adapted for improving the robustness against specific types of geometric distortions. Rotation, cropping or scaling by a noticeable amount can be handled by hypothesis testing which however results in a computational intensive search for maximum correlation.

Figure 4:
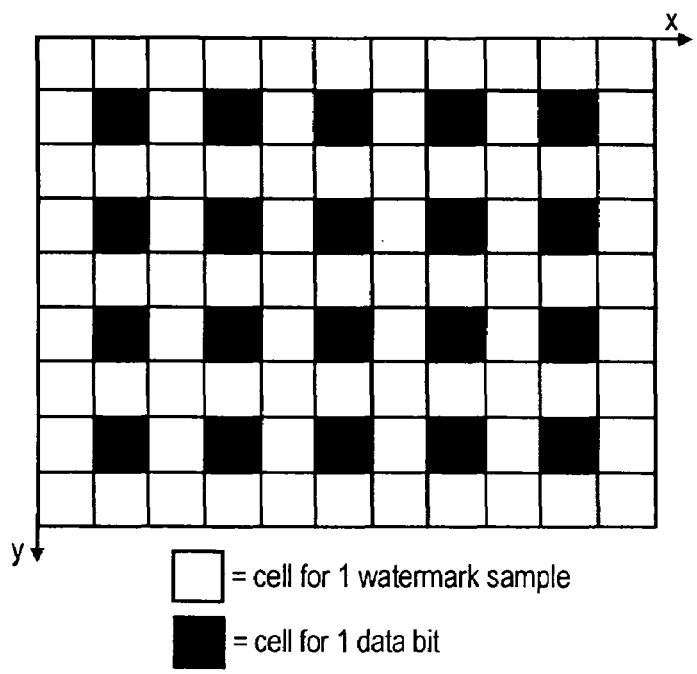
FIG. 4 illustrates partition of a picture into square cells that carry either a watermark sample or a data bit.

A common method for increasing the capacity of the hidden data channel is to partition the picture into sub-pictures and to apply the above watermarking method to each sub-picture. Another method for increasing the data capacity shall now be exemplified for a square cell shape, see FIG. 4. The white cells are used for the watermarking method as described above. Firstly, the watermark is detected from the white cells at the receiver. This also allows synchronisation and alignment of the sampling grid. Secondly, one data bit is detected from each dark cell as follows. For the k-th cell the DC-values of eqs. (6)–(8) are calculated. In restricted watermarking, the sign of the difference $\Delta DC(k)=(DC(k)-DC_{ori}(k))$ signals the data bit and in unrestricted watermarking the sign of the difference $\Delta DC(k)=(DC(k)-DC_{pred}(k))$ signals the data bit. At the transmitter the data bit is embedded similar to eqs. (2)–(5), the watermark sample is replaced with the antipodal data bit in eq. (2). As no information is embedded into flat areas and prediction can fail in local areas of the picture the detector has the option to evaluate the data bit only if $th_{data,min}<|\Delta DC(k)=(DC(k)-DC_{pred}(k))|<th_{data,max}$, this can be taken into account during embedding.

The above method significantly increases the gross data rate. However, robustness is lost in comparison with the watermark that is carried on the white cells. Therefore, error correcting codes are applied to the data that is carried on the dark cells.

We have described above methods of increasing data rate. In addition to the prediction technique already outlined we will describe another way of increasing the payload. Instead of using one pseudo-random bit pattern as the watermark w a plurality of N substantially statistically independent patterns $w_1, \ldots, w_N$ is used. The patterns are preferably statistically independent with the following properties:

$$w^2_1 = \ldots = w^2_N = 1 \quad (1)$$

$$E[w_1] = \ldots = E[w_N] = 0, \text{ where E is the expectation operator} \quad (2)$$

$$E[w_k \cdot w_n] = 0 \text{ if } k \neq n \quad (3)$$

Each payload is represented by a combination of three watermarks. Although there could be fewer (for example 2) or more watermarks combined to increase the data capacity, we have found that, surprisingly, by combining exactly three watermarks from a number (ideally a defined set) of substantially independent watermarks, an optimum result may be achieved in terms of reliability of detection and increase in data payload. Thus, there is a total of $N \cdot (N-1) \cdot (N-2)/6$ possible combinations (neglecting trivial or redundant combinations in which two or three watermarks are the same or the order of combination is altered [which cannot be detected using simple combination of watermarks with the picture]). For example, if N=16 there are 560 combinations, and one can carry a payload of 9 information bits, plus reserved combinations for other signalling. Surprisingly, we have found that the payload may be most advantageously increased by selecting a reasonably large number of independent watermarks in this set or "library" and then combining exactly three of these in any one picture (rather than combining larger numbers of watermarks), the maximum size of the library being dependent on the ease with which watermarks can be distinguished, so varying with picture size. In order to ease the notation let us further assume that the actual payload is represented by the three watermarks $w_1, w_2, w_3$. One could then generate a watermark w, by calculating the average value of $w_1$, $w_2$ and $w_3$.

$$w=[w_1+w_2+w_3]/3 \quad (4)$$

However, this combination has the property that the expectation value of the product of any of the individual watermarks with the combined watermark is ⅓.

$$E[w \cdot w_1]=E[w \cdot w_2]=E[w \cdot w_3]=\frac{1}{3} \quad (5)$$

A more advantageous way of combining $w_1$, $w_2$ and $w_3$ is, $$w=[w_1+w_2+w_3-w_1 \cdot w_2 \cdot w_3]/2 \quad (6)$$

The watermark w then has the following properties, $$w^2=1 \quad (7)$$

$$E[w]=0 \quad (8)$$

$$E[w \cdot w_1]=E[w \cdot w_2]=E[w \cdot w_3]=\frac{1}{2} \quad (9)$$

The watermark w is embedded in the DC-values of the picture in the usual way. For detection of the payload one generates the watermark w'

$$w' = w_1 + \ldots + w_N \qquad (10)$$

and cross-correlates the watermark w' with the DC-values of the pictures in the usual way. If a correlation-peak is detected, the payload is retrieved by cross-correlating each watermark $w_1, \ldots, w_N$ separately with the DC-values and selecting the three watermarks with the largest correlation peaks. Although, as mentioned above, it is greatly preferred if the patterns are independent and satisfy the above rules, it may be desirable in some cases to use patterns which are not truly independent but have a low level of cross correlation (this may increase the number of patterns that can be used or simplify pattern selection); this may make it harder to detect each component reliably, but this may be useful in certain applications, for example where it is intended that the data embedded should be well concealed or "fragile" (i.e. easily corrupted). The above provides a method of combining three bipolar watermarks to produce a single bipolar watermark with the property that the product of the combined watermark with each of the constituent marks has an expectation value of ½.

To increase the reliability of data embedding, the available watermarks may be sub-divided into subsets. To recap, the method described above gave a possible 560 combinations, based on the binomial co-efficient $$\binom{16}{3} = \frac{16!}{3!.(16-3)} = 560$$

which, as mentioned, is just over $2^9$.

Figure 5:
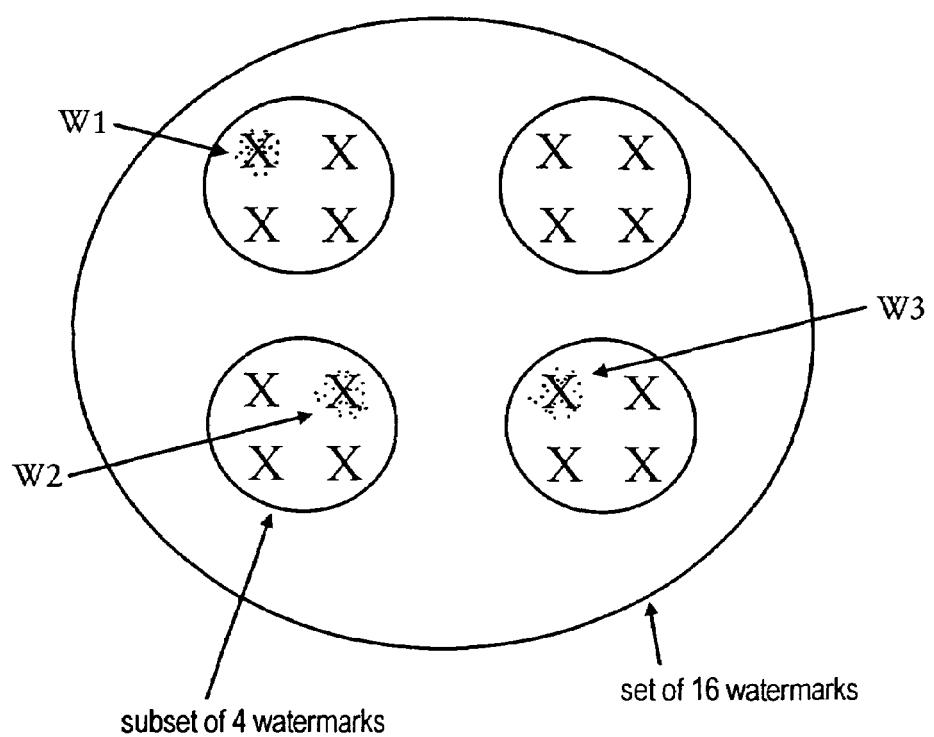
FIG. 5 illustrates sub-division of a set of 16 watermarks into 4 subsets of 4.

In a modified proposal, the set is portioned into 4 subsets of 4 marks and exactly one mark is chosen from each of 3 subsets, as schematically illustrated in FIG. 5. This gives as a number of possible combinations $$\binom{4}{3} \cdot \binom{4}{1}^3 = 256$$

which is exactly $2^8$ so exactly 8 bits can be carried, with increased robustness, the first binomial coefficient giving the number of ways of choosing 3 subsets from 4 and the second giving the number of ways of choosing 1 from 4 watermarks in a subset.

Although the number of bits of information that is conveyed has been reduced, a detection strategy can be used that can give increased confidence in the reliability of any data detected.

When correlation detection is used, the presence of a peak, over a certain threshold, in the correlation surface of the watermark and the picture (after pre-processing), indicates that the mark has been detected.

The following procedure may be used to extract the data conveyed by the watermarks.

1) Check that exactly three subsets have been used.
   Cross-correlate the picture with each of the 16 watermarks in turn. If there are more or fewer than three cross-correlation functions with peaks above the detection threshold then no data can be recovered.

2) Inspect the distribution of the three peaks.
   If there are three peaks, they should each belong to a different subset of 4 of the 16 possible watermarks. If more than one mark in a subset has a cross-correlation peak above the threshold then no data can be recovered.

3) Each peak conveys 2 bits of data, and the set of three conveys 2 bits of data.

A particular advantage is that a soft decision threshold can be used, when detection falls below the threshold. For example, the three highest peaks that are derived from different subsets could be used. That is, the threshold can be varied until exactly 3 peaks are detected, with one in each subset, the fact that each mark is in a different subset serving as a check (if the three marks giving the highest peaks are not in different subsets, an error can be assumed).

Higher Data Rate Watermarking

A variety of methods with differing data capacities have been discussed. A further embodiment which may allow the amount of data carried to be increased will now be described, with reference to FIGS. 6–8.

To convey a data payload within a video watermark, such as the system described previously, the following method may be employed to scatter the payload data across the picture.

Figure 6:
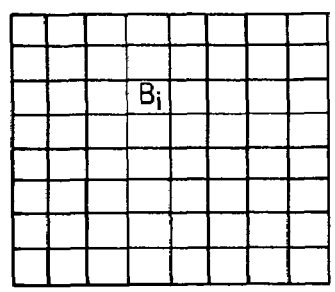
FIG. 6 shows an 8×8 sample block for carrying data.
Figure 7:
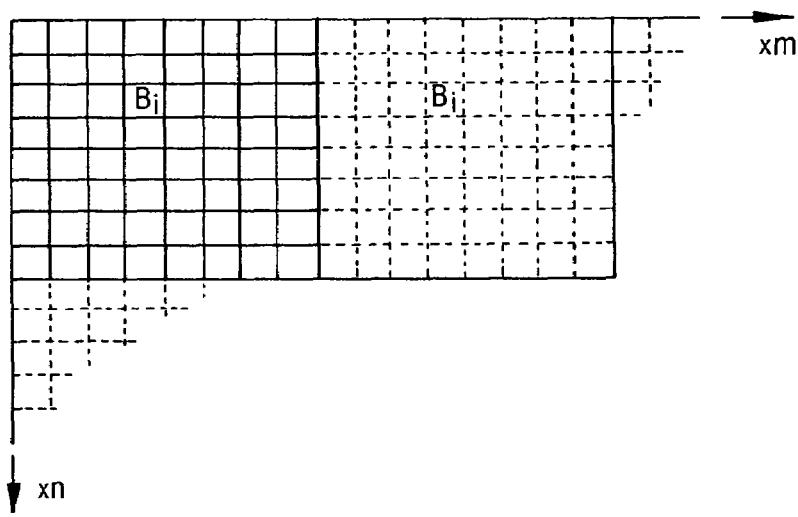
FIG. 7 shows the blocks of FIG. 6 tiled m×n.

The payload, for example 64 bits having values +1 or −1, may be configured as a block of 8×8 bits (as shown in FIG. 6), which may then be tiled m×n times to form a data array as in FIG. 7. Bi is one bit in this 8×8 block.

In the watermark encoder each occurrence of payload data Bi is convolved with a pseudo-random sequence of length m×n corresponding to a predetermined key. This is done for each of the 8×8 payload data bits. Each resulting value in this (8×m)×(8×n) array is then used as a watermark. Of course, where different payload sizes and shapes and different tiling patterns are used, the bits of the payload will be convolved with the bits of the key in an appropriate fashion. Convolution of the data is most preferably performed by a multiplication (considering the data to be signed + or −) or equivalently an XOR [or XNOR] operation (considering the input data to be unsigned). The process may be explained as follows:—

| Bipolar multiplication | | | Unipolar XOR | | |
| --- | --- | --- | --- | --- | --- |
| Data | Key | Watermark | Data | Key | Watermark |
| +1 | +1 | +1 | 1 | 1 | 0 |
| +1 | −1 | −1 | 1 | 0 | 1 |
| −1 | +1 | −1 | 0 | 1 | 1 |
| −1 | −1 | +1 | 0 | 0 | 0 |

The watermark is ideally a zero mean, as indicated above, so if the watermark is generated from a logical XOR, the binary values 0 and 1 would in fact be applied to the picture as bipolar values, with 1 corresponding to +1 and 0 corresponding to −1 (or vice versa). It will be noted that the absolute amounts to be added to or subtracted from each pixel value may in fact vary from pixel to pixel, based on a local estimate of visibility, as described above; however, whilst this is highly preferred, the method of generating a watermark which carries data can be used in conjunction with another method of embedding the watermark.

Figure 8:
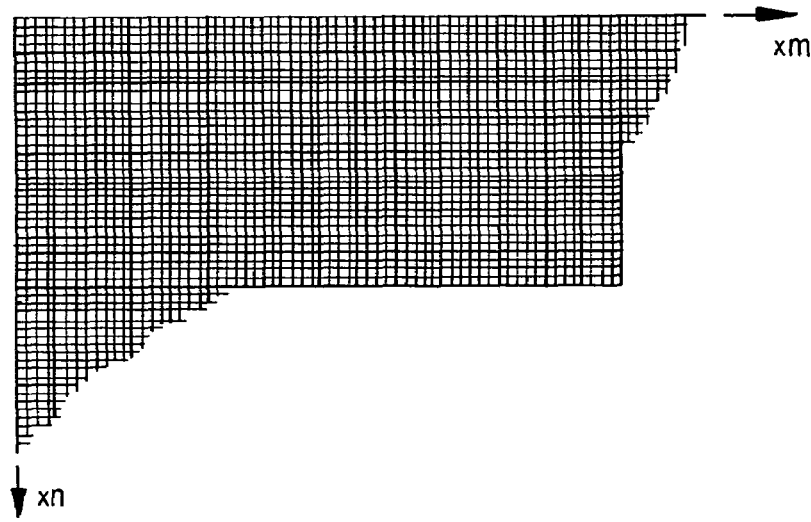
FIG. 8 shows the tiled blocks of FIG. 7 forming a data watermark spread across a picture.

Each bit of the resulting watermark is applied to a block of pixels in a picture (ideally 4×4, which is found to give optimum results in terms of enabling each data bit to be reliably detected and allowing a large key and data payload size, but other block sizes and shapes may be used) such that the array is spread over the whole or part of the extent of the picture, as shown in FIG. 8. In a most preferred example, for a television picture of 576 lines by 720 pixels, this gives 18×22.5 blocks of 8×8 data bits each spread over a block of 4×4 pixels; this allows 405 bits for the key (the geometric arrangement is not critical, so the half blocks can be split over 2 lines). This arrangement is advantageous as the relatively large key allows reliable detection, but still allows a useful data payload. Of course, other payload sizes and configurations may be used, for example 16×8 blocks may carry 128 bits with a 202 bit key and 16×16 blocks may carry 256 bits, allowing 101 bits for the key; such a key may still be reliably detected in many cases. For example if the watermark is applied to a signal as it is transmitted, such a key should be detectable at a receiver, for example to enable programme identification information to be decoded reliably. The blocks need not be square, nor even rectangular (though these are most convenient for efficient packing of data, and less vulnerable to corruption of data by resizing operations) or even regular, but any shape which can be applied many times over the picture and interlocking or disjointed, but preferably non-overlapping shapes, may be used. To summarise, the method of embedding the watermark may be considered in three ways as follows:—

1) Block by Block

The data block is replicated n×m times, so in our example we can consider a set of 405 8×8 data blocks all containing identical data. 405 individual pseudo-random sequences of length 8×8=64 (having values +1 and −1) are then convolved with the data in each block.

The blocks are then assembled to make a single rectangular array in some convenient manner, and each point in that array is expanded to cover, in our example, say 4×4 individual pixels in the picture (for a picture of normal European TV resolution, 720×576). This watermark may then be combined with other watermarks, as discussed below.

2) Whole Picture

The picture area is to be considered as groups of say a×b pixels. In our example, this is 4×4. The data block is replicated n×m times across the entire picture, such that each element of an 8×m by 8×n (180×144) array corresponds to a 4×4 cluster of picture pixels. Special arrangements must be made for edge effects if n or m are not integers. In our example a single pseudo-random sequence of length 8×8× 22.5×18=25920 (having values +1 and −1) is then convolved with the 180×144 array.

Each point in the resulting array is expanded to cover, in our example, 4×4 individual pixels in the picture (for a picture of normal European TV resolution, 720×576). This watermark may then be combined with other watermarks, as discussed below.

3) Data Bit by Data Bit

Each data bit in the 8×8 data block is replicated n×m times, to create a set of 64 m×n arrays. To take account of the non-integer value of m or n, the resulting array may have varying number of data points on each line, or may be considered as a set of 64 405-element linear arrays. 64 individual pseudo-random sequences of length 22.5×18=405 (having values +1 and −1) are then convolved with each array.

The 64 arrays are then interleaved (every 8 positions vertically and horizontally, or in some other way) to make a single rectangular array of size 180×144 (in our example), and each point in that array is expanded to cover, in our example, 4×4 individual pixels in the picture (for a picture of normal European TV resolution, 720×576). This watermark may then be combined with other watermarks, as discussed below.

The resulting watermark may be applied as a single watermark to the picture, and detected as for other watermarks by cross correlation with the key.

It will be appreciated that the three examples mentioned above may be applied to different watermark and data payload sizes.

Most preferably, using the principles discussed above, and, as discussed further below, a further registration watermark is included, at a known position with respect to the data-carrying watermark. It is desirable, as discussed above that the registration watermark is substantially orthogonal to the data carrying watermark. It will be appreciated that the data carrying watermark varies with the data, and it is not practicable to test every possible data set for orthogonality of the resulting data-carrying watermark with the registration watermark. It is, however, possible to test each (405 bit or whatever size) key segment for degree of correlation with the corresponding (i.e. co-located) segment of the registration watermark to ensure a low correlation for each segment. Since the data merely affects the sign of each segment, if the correlation is low, it will remain low whatever the data. Thus, in the ideal case where the correlation between each key segment and each corresponding watermark segment is exactly zero, this will remain true whatever the data, and the sum of the correlations, being the correlation between the complete data-carrying watermark and registration watermark, will also be zero. It is important to note that simply correlating a complete data carrying watermark (for example with dummy data all 1 s) with the complete registration watermark will not give a reliable test as some segments may cancel by chance, but would not cancel if the data were different.

Turning to the method of detection, this may comprise:—

A) Perform local averaging over each 4×4 (or whatever was used) block of pixels to extract DC prediction values (as described above, see particularly equation 8 above and related description). In a preferred implementation, we have found that performing 2×2 averaging, determining DC prediction values for each 2×2 block, and then forming a single average DC prediction value for each 4×4 block may yield better results. This feature may be applied independently, in particular to the basic watermarking technique mentioned above.

B) For each data bit position within each 8×8 block (or whatever shape or size was used), determine the corresponding n×m block (or whatever shape was used) or sequence of key bits to correlate with the predetermined key (or one of a number of predetermined keys—see below). A strong positive or negative correlation gives a positive or negative value for the data bit accordingly (or vice versa) and failure to correlate above a threshold indicates that the picture may be corrupted, or the data unreliable.

As an optional check, the key values can be re-correlated, using the determined data values, to give a further measure of reliability. If the starting position in the picture was not certain, the process may be repeated for different positions or offsets, to determine the position which gives the maximum correlation.

The key used most preferably varies for each data bit. Looked at another way, each key (say 405 bits) can be viewed as a key segment of a larger key (64*405 bits). Using a different key for each bit ensures that the data bits can be distinguished and are not decoded in the wrong sequence due to shifts in the picture, and also avoids repeating patterns in the watermark, thereby reducing detectability. On the other hand, in the event that the data is shifted, the data will then become undetectable without searching for a registration point. In a preferred implementation, an additional registration watermark is provided, as discussed below, to facilitate registration; once the position of the known, higher dimension watermark is determined accurately, the data can be reliably detected. As with the embedding process, the detection process can be viewed in three ways, as follows:—

1) Block by Block

In the detector the picture frame is processed creating a DC prediction error matrix of dimensions 22.5×8 by 18×8. This is broken down into 405 individual 8×8 blocks, each of which is multiplied by the pseudo-random sequence with which it was originally convolved. Averaging the 405 blocks will produce a single 8×8 correlation matrix, with positive or negative values in each cell of the matrix corresponding to the sign of the original data.

2) Whole Picture

In the detector the picture frame is processed creating a DC prediction error matrix of dimensions 180 by 144. This is multiplied by the same pseudo-random sequence as that with which it was originally convolved. Averaging every eighth value along every eighth line (405 points) for each position of an 8×8 array will produce an 8×8 correlation matrix, with positive or negative values in each cell of the matrix corresponding to the sign of the original data.

3) Data Bit by Data Bit

In the detector the picture frame is processed creating a DC prediction error matrix of dimensions 180 by 144. This is broken down into 64 individual m×n arrays by the inverse process by which they were assembled into a single array, and each of them is multiplied by the pseudo-random sequence with which it was originally convolved. Averaging the 405 values in each of the 64 blocks will produce 64 correlation values, with positive or negative values corresponding to the sign of the original data.

It will be seen that all three embedding and detection methods are equivalent and have equivalent effects on a picture, but may differ in the way in which they are implemented in hardware or software (all aspects and features of the invention may be implemented in either or a combination of both), for example in the loop structure of a software implementation or the processing layout of a hardware implementation.

To improve accuracy and reliability of detection, it is useful to include a further watermark, the content of which is fixed, or which has a larger fixed (key) content and smaller data content, for example the watermark may be used as one of several (most preferably three) watermarks $w_k$, in the manner described above. As stated, the watermark may be combined with one or more fixed watermarks or further data carrying watermarks. In the latter case, the different data carrying watermarks are preferably convolved with substantially orthogonal keys. In one example, a single fixed watermark, selected from a small group of fixed watermarks. Thus, applying the principles described above for encoding data by including exactly three from sixteen watermarks, ideally sub-divided into four subsets of four watermarks (or whatever other numbers are chosen), in this case, the keys rather than complete watermarks are chosen as indicated above and the watermarks themselves are generated by convolving the keys with further data. Thus, choosing 3 from 4 subsets of 4 keys allows 8 bits to be encoded, applying the principles mentioned above. In addition, each key is convolved with an 8×8 block of 64 bits of data, giving a total of 3*64+8=200 bits. It will be appreciated that certain information will be carried more robustly than other information, and the principle of carrying information with differing degrees of robustness may be independently provided, using other methods for encoding the data. A preferred implementation has one registration watermark, preferably selected from a relatively small set of possible watermarks, the choice of watermark encoding a few bits of information and two data-carrying watermarks, preferably each using a fixed key and encoding typically 64 bits of data each.

References to convolving data with a key as used herein are not limited to the multiplying and XOR operations described but apply more generally to combination in which the resulting watermark is a function of both the data and the key, particularly any form of combining wherein the data can be extracted from the resulting watermark using the key.

The above described methods for carrying hidden data and watermarking can be applied to both still and moving pictures. In the latter case motion imposes an additional problem in terms of attacks and visibility of the watermark, and the spatial model of eqs. (3)–(5) may have to be enhanced to a spatio-temporal model, resulting in motion-compensating embedding and detection. A simpler method is to embed the same static watermark only in every n-th (for example every second or third) picture of a moving sequence and/or to alternate between different static watermarks and/or grid patterns.

It is preferable in the case of a moving picture to change the data carried by the watermark only at certain prespecified points, preferably when a shot change is detected or when an accumulated change in picture content exceeds a threshold. Preferably, the watermark position is moved at a data change, as discussed below. Preferably a key portion of the watermark is changed when the data is changed, for example a key sequence may be stepped through. The key sequence may be generated from a pseudo random sequence, preferably having a seed value, preferably using a Blum, Blum, Shub random number generator. One or more seed(s) for the random number generator may be communicated to a decoder, preferably embedded in a picture by a method disclosed herein and one or more seed or feature of the algorithm may be stored in the decoder so that the decoder may follow the sequence but an unauthorised party not knowing the seed and algorithm cannot easily do so.

To detect such a watermark, it is necessary to search for the position of the watermark at each shot change. In a detection method which may be provided independently, the invention provides a method of detecting a watermark in a sequence of moving pictures comprising determining an expected position of the watermark and thereafter detecting the watermark based on the expected position, wherein the expected position is re-determined following a shot change or a change in picture content above a threshold.

To reduce the visibility of a watermark in a sequence of moving pictures, it may be desirable to invert the sign of the watermark between pictures each time it is embedded, or according to a predetermined or pseudo-random sequence; in this way the mark will tend to average to zero (not exactly due to picture content modulation) and so will be less visible. This feature may be provided independently or in combination with other features.

The position of the watermark may be moved, particularly if the watermark is a simple pattern such as a chequerboard or the like. The position in the picture can be determined by correlation with a fixed watermark. The position, or more preferably (this is more rugged), relative movement may itself be used to encode information, for example with up, down, left, right being assigned to 2 bit code pairs, or 3 bits if diagonal movement is encoded. The distance moved may be used to encode further information, although this may be less rugged, particularly if the picture is processed by an effects processor. Each of these features relating to movement may be provided independently or in combination with other features.

In one preferred implementation, which may be provided independently, the watermark is moved, preferably randomly (preferably based on a random noise generator rather than a pseudo random sequence generator) substantially at each shot change, or whenever a measure of accumulated change in picture content exceeds a threshold. In the case of a data carrying watermark, preferably the data carried is changed at the same time as the watermark is moved, preferably every shot change. Such changes can assist in reducing detectability by unauthorised persons.

To hide the watermark better, it may be "attached" to a moving object and may move with the object. For example, using algorithms similar to MPEG-2 algorithms to assign motion vectors to blocks (indeed the same coding when the picture itself is to be MPEG coded), a watermark or portions of a watermark may be applied to blocks and then move with the blocks. A drawback, however, is that decoding such a picture will normally require either some information from the original picture or complex image processing algorithms (to identify the objects to which the watermark is attached). This may nonetheless be useful when the picture is being compared to an original version of the picture, for example to detect copying as it will be hard for a pirate to identify and remove the watermark. This feature may be independently provided.

To explain the watermarking of a moving sequence in more detail, the process of averaging many pictures together to produce a single picture has the effect of reducing the variance of the picture luminance if the pictures are time-varying. If the watermark is static the result is that the amplitude of the watermark becomes larger relative to the variance of the picture luminance. If a sufficiently large number of watermarked pictures are averaged, the dominant feature will be the watermark. In practice this might be of the order of 6000 pictures-4 minutes at television rates. This property may be undesirable since it may assist in revealing the 'secret key' of the watermark. Another problem that may arise when pictures that contain motion are watermarked is that the static watermark may become more visible when the picture to which it is applied is moving. The subjective effect is that of seeing the picture through a glass screen containing imperfections. This may be undesirable for two reasons, because it represents a reduction in the quality of the signals that are produced and because it gives a clue about the nature of the watermarking process that might be useful to malicious persons, in a similar manner to the problem of averaging mentioned above.

Above, motion-compensated embedding is proposed; a motion-compensation method will now be described in more detail in which the static watermark pattern is moved to follow the average motion of the contents of the picture. The features to be described, as well as the general feature of the watermark following motion in a picture, may be employed independently of other features and the features are independent of the precise implementation method used.

To implement this method, as a first step, the average motion of the picture is determined; this may be achieved by any of a number of known methods, such as phase correlation or block matching, each of which have known relative advantages and disadvantages and the implementation is not limited to any particular method. The strength of the watermark is preferably reduced in areas where the actual motion does not match the average motion.

As will be appreciated, the process of determining whether the average motion is a good estimate of the actual motion in a particular part of the picture can be done in several ways and the embodiment is not limited to any particular method. One example of a more accurate method is to divide the picture into smaller blocks and perform a block-matching or correlation process on pairs of blocks. This kind of method is typically used in MPEG-2 video coders to calculate motion vectors. An example of another method, which is less accurate, but computationally far simpler, is simply to compare luminance levels, pixel-by-pixel, between an actual picture and a picture predicted using a motion estimate. If there is a significant difference, then it is assumed that the motion estimate was not accurate.

Detection typically relies on averaging several pictures and account must be taken of the average motion before this. Before the picture sequence is added together, each picture must preferably be shifted to undo the average motion relative to the first picture. Again, the precise method of determining average motion is not critical but it is very highly desirable that the process by which the average motion estimate is made is the same as in the embedding process; otherwise errors may be introduced. A specific implementation of the above will now be described in yet further detail.

An exemplary embedding process is as follows:

1) a watermark $W_k$ is embedded in picture $P_k$ 2) the average motion, $v_k$, from $P_k$ to picture $P_{k+1}$ is measured.

This may conveniently be achieved by calculating the cross-correlation function of picture $P_k$ and $P_{k+1}$; this has the benefit of being relatively simple to implement and readily applicable in the step of detection of the watermark. Another benefit is that the apparatus may already include hardware accelerators (or optimised code) for calculating cross correlation of at least a portion of a picture, for other reasons.

3) a spatially shifted watermark $W_{k+1}$ is calculated by applying a cyclic shift to $W_k$ according to the motion estimate $v_k$ 4) the error, $E_{k+1}$, in the estimated picture is calculated.

One way this may be achieved by applying the same shift to $P_k$ to give $P^*_{k+1}$, and calculating the difference between pixel luminance values in the estimate $P^*_{k+1}$ and the actual $P_{k+1}$. Another, more advanced, method for calculating the error $E_{k+1}$ is to compare for each pixel the accuracy of the global shift with the estimate of a 'true' motion estimator.

5) the watermark $W_{k+1}$ is then modulated according to the error signal $E_{k+1}$ to generate $W'_{k+1}=W_{k+1} \cdot f(E_{k+1})$.

The function f is preferably chosen to assist in concealing the watermark in areas where the motion estimate is not accurate and is preferably, but not necessarily, a non-linear function of the error signal. However, the function should also be readily implementable and one simple example is the use of a linear function $(C-|E_{k+1}|)$ where C is a constant equal to the possible range of the error E. The function f may also take into account the occurrence of a shot change or of a still picture displayed over several frame periods; various functions may be chosen depending on the degree to which concealment is required and the computational power available to implement the function.

6) the modulated, shifted watermark $W'_{k+1}$ is embedded into the picture $P_{k+1}$ substantially as described in detail above for static pictures.

This process is then repeated starting at step 2).

A corresponding detection process is as follows:

1) the average motion, $v_k$, from $P_k$ to picture $P_{k+1}$ is measured.

As above, this may conveniently be achieved by calculating the cross-correlation function of picture $P_k$ with $P_{k+1}$, although other methods may be used in both cases.

2) a spatially shifted version of $P_{k+1}$, $P'_{k+1}$, is calculated by applying a cyclic shift opposite to $v_k$ 3) the spatially shifted picture $P'_{k+1}$ is added to $P_k$ 4) the average motion, $v_{k+1}$, from picture $P_{k+1}$ to picture $P_{k+2}$ is measured by calculating the correlation function of picture $P_{k+1}$ with $P_{k+2}$ 5) a spatially shifted picture $P'_{k+2}$ is calculated by applying a cyclic shift opposite to $(v_k+v_{k+1})$ to $P_{k+2}$ 6) the spatially shifted picture $P'_{k+2}$ is added to the sum of $P_k$ and $P'_{k+1}$ Steps 4), 5), and 6) are repeated over the number of pictures, N, required for an adequate level of detection to produce a motion compensated average picture P'''

$$P''' = (P_k + P'_{k+1} + P'_{k+2} + \ldots + P'_{N+k-1})/N$$

7) the cross-correlation function of the average picture P''' with the watermark $W_k$ is calculated as for a static watermark (it will be noted that this may employ or share some hardware or software with the cross-correlation used to determine motion)

The use of motion-compensated watermarking thus makes embedded watermarks difficult to detect by unauthorised individuals and reduces picture degradation.

Preferred Applications

The uses of the watermark fall broadly into two categories, one is identification, the other is authentication. Identification associates the signal with descriptive information. In general, the association is made by using the watermark to convey a unique identification number that points to a record in a database holding more information. Authentication establishes the credibility of a signal. To identify a signal the watermark should be difficult to remove, should be robust against distortions and should be difficult to perceive. To authenticate a signal the watermark should be difficult to create (or imitate), should be sensitive to distortions but can be easy to perceive. The system described above is particularly useful for identification, but, as discussed, may be adapted for either application. There are many scenarios in which the identity of the signal is of significance. Some of these are as follows:

Copyright Protection

Somebody who has created something of artistic worth might wish to be rewarded for the use of their creation. A broadcaster who creates a television programme usually retains rights over the programme. Limited rights to the programme might be sold to another broadcaster permitting some use of the programme—a defined number of broadcasts in a defined geographical area perhaps. The broadcaster owning the rights would like know that the rights granted are not exceeded. If a watermark is added to the programme before it is sold, monitoring of broadcasts around the world can generate reports of detection of the broadcast of the programme by virtue of detecting the watermark. The record of the detections can be analysed to find out whether the rights granted have been exceeded. Copyright infringements that might be found in this way would include the transmission of a programme more times than were agreed, transmission of the programme in more geographical regions than were agreed, or the theft of the programme (either by recording or retransmission of a legitimate broadcast) and use by someone unauthorised. To identify the route by which a programme came to be used illegitimately, a watermark can be made specific to an individual copy of the programme. Such a watermark is often called a fingerprint. This can be used to identify the recipient of the programme of which the rights were infringed as well as the originator.

Copy Protection

As a step further on from detection of copyright infringements, a watermark can also be used to control the duplication of material. If a recording system is used that will not record signals in which it detects a particular watermark, then this provides a means of preventing illegitimate copies of the recording being made by that system. A related application would use an authenticating watermark to prevent replay of signals unless the mark were detectable in the signals.

Production Meta-Data Tracking

The processes that are involved in producing television programmes are often complex and numerous. To keep track of all the programme material during this procedure can be difficult. The descriptive information, called meta-data, associated with the picture or sound signal (such as what it is, where it came from, where it has been used, where it will be used) can easily become dissociated from the signal itself. A simple example would occur when a self-adhesive label carrying a unique identifying programme number falls off the side of a video-cassette. An identifying watermark embedded in the pictures can be used to relate the pictures back to the descriptive information. Data embedded may comprise a SMPTE Unique Material Identifier (UMID) or a subset of the data defined therein or a proprietary programme identifier such as a British Broadcasting Corporation Audio-visual number. Considerations pursuant to the invention suggest that, for most purposes, a 32 bit number may be adequate. However, 48 bits is preferable and a 64 bit identifier enables maximum flexibility of encoding for a variety of producers, users and purposes. Since it has not hitherto been easy to embed such amounts of data in a picture, prior art considerations have concentrated on packing data into a small identifier, rather than increasing the data payload.

The stage of the production process at which such a watermark is embedded depends of the information tracking requirements. Conceivably, the watermark could be embedded by a camera and could consist of a unique identifier which conveys the time of day and geographical location as well as a serial number corresponding to the camera. This would allow the plethora of constituent video clips that are combined to make a typical television programme to be identified and traced back to their source at any stage of the process, even, given sufficient robustness, after broadcast and re-recording.

At each stage of the production process, including final broadcast, every piece of equipment, on detecting the watermark, could update a database that records the use of all programme material. This can be used to check that contractual agreements relating to rights are not being breached, or to ensure that when material is used anyone entitled to payment for its use is paid.

Each feature disclosed herein may be independently provided, unless otherwise stated. The appended abstract is incorporated herein by reference.

The invention claimed is:

1. A method of embedding a watermark signal comprising a series of watermark values in a picture signal comprising a series of picture sample values, the method comprising adjusting picture sample values based on watermark values wherein the watermark is derived from a combination of a number of substantially independent watermarks or wherein a number of substantially independent watermarks are embedded in each picture wherein said substantially independent watermarks satisfy the following criteria:—

$$w^2_1 = \ldots = w^2_N = 1 \qquad (1)$$

$$E[w_1] = \ldots = E[w_N] = 0, \text{ where E is the expectation operator} \qquad (2)$$

$$E[w_k \cdot w_n] = 0 \text{ if } k \neq n \qquad (3).$$

2. A method according to claim 1, wherein said number of substantially independent watermarks comprises a subset selected from a defined set of substantially independent watermarks.

3. A method according to claim 2, wherein said number is three.

4. A method according to claim 2, wherein there are more than three substantially independent watermarks in said set.

5. A method according to claim 1, wherein the subset is selected or said substantially independent watermarks are selected in dependence on information to be encoded in the picture.

6. A method according to claim 1, wherein three bipolar watermarks are combined to produce a single bipolar watermark with the property that the product of the combined watermark with each of the constituent marks has an expectation value of ½.

7. A method according claim 1 including generating the watermark by convolving a key with a repeated data sequence to produce a data-carrying watermark.

8. A method according to claim 1, wherein the picture is divided into two or more sub-pictures, and a substantially independent watermark is embedded into each sub-picture.

* * * * *